United States Patent [19]

Milne

[11] 3,859,215

[45] Jan. 7, 1975

[54] SEWAGE TREATMENT SYSTEM
[76] Inventor: George A. Milne, 44-116 Kavinohea Pl., Kaneohe, Hawaii 96744
[22] Filed: Apr. 21, 1972
[21] Appl. No.: 246,253

[52] U.S. Cl............ 210/170, 210/195, 210/197, 210/199, 210/202, 210/218, 210/242
[51] Int. Cl............................ C02c 1/08, C02c 1/12
[58] Field of Search........ 210/7, 15, 170, 19 A, 195, 210/197, 202, 218, 220, 221, 259, 199, 242

[56] References Cited
UNITED STATES PATENTS

| 2,798,042 | 7/1957 | Cox | 210/195 X |
|---|---|---|---|
| 3,047,492 | 7/1962 | Gambrel | 210/259 X |
| 3,204,768 | 9/1965 | Daniel | 210/197 |
| 3,234,880 | 2/1966 | Hampton | 210/195 X |
| 3,306,447 | 2/1967 | medeiros | 210/170 X |
| 3,348,687 | 10/1967 | Foster | 210/195 |
| 3,396,102 | 8/1968 | Forrest | 210/259 X |
| 3,400,822 | 9/1968 | Mckeown | 210/195 |
| 3,425,555 | 2/1969 | Ridgeway | 210/170 X |
| 3,438,499 | 4/1969 | McKeown | 210/195 X |
| 3,477,581 | 11/1969 | Medeiros | 210/195 |
| 3,525,685 | 8/1970 | Edwards | 210/15 |
| 3,607,735 | 9/1971 | Hover et al. | 210/7 |
| 3,666,103 | 5/1972 | Green | 210/197 X |
| 3,680,704 | 8/1972 | Schaefer | 210/170 X |
| 3,695,439 | 10/1972 | Dupre | 210/197 X |

OTHER PUBLICATIONS

Builders Report Pacific, Hawaii's Weekly Construction Magazine, Oct. 4, 1971.

Primary Examiner—John Adee
Assistant Examiner—Robert H. Spitzer
Attorney, Agent, or Firm—James C. Wray

[57] ABSTRACT

A sewage aeration tank is constructed as an elongated cylinder with a horizontal axis having a length to diameter ratio of greater than three to one. The large aeration tank is completely closed and has openings tightly surrounding sewage inlet and effluent pipes, sludge return pipes, oxygenation pipes and vent pipes. The large aeration tank and its sewage inlet, grease and trash trap, clarifier, sludge return lines from the clarifier to the aeration tank, tertiary treatment tank and outflow apparatus are buried underground. A recreational space is provided on top of the system. An air blower is housed in an equipment room of an adjacent apartment unit which the system serves, and a vent extends upward from a roof of the apartment house.

9 Claims, 3 Drawing Figures

SEWAGE TREATMENT SYSTEM

BACKGROUND OF THE INVENTION

Historically, sewage treatment systems for multiple unit developments have conducted raw sewage through long conduits to a place far distant from the source. The sewage is then treated in open containers to encourage the proliferation of aerobic bacteria for the digestion of the sewage by converting organic material into simpler chemical compounds through the action of enzymes produced by the living organisms. Odoriferous gases, which are contained in the sewage and which are formed by decomposition, pervade the area of the sewage treatment facility. Moreover, the large, open tanks are unsightly. Consequently, it is to the greatest advantage to provide large sewage treatment facilities which are sufficiently far from populated areas to render the distasteful esthetics of the plant inobtrusive.

As population increases, such remote areas of sewage disposal plants become less and less available. Because of the distasteful nature of the plants, it has been the practice to create large branched collection networks which are served by large centralized disposal plants. Costs of effective sewage treatment are increased by the necessity of handling a large quantity of sewage in a small area and by the expense of the large collection networks of branch sewers, main sewers, trunk sewers and interceptors which serve centralized facilities. Discharge in outfall sewers from such facilities has been far heavier in pollutants than desired or than permissible.

Where limited amounts of funds are available for sewage treatment, the money required for construction of sewage collection and transportation systems subtracts from money available for sewage treatment. Thus, the systems of the prior art which require long range transportation of sewage to remote sewage plants have heretofore unresolved difficulties of high sewage transmission costs and inefficiency due to the need for processing large quantities of liquid at a single geographical location. New developments tend to overcrowd existing facilities and to reduce their effectiveness in treatment because of existing collection systems and existing interceptor sewers which provide ready communication to existing plants. New developments are often hampered and dictated by the availability of sewers connected to existing facilities or by the availability of land for building new treatment facilities. The most desirable developments from economic and geographic considerations are sometimes unavailing because of the lack of proper sewage collection systems.

Known small treatment plants which may be employed for industrial or housing developments employ open tanks. The esthetics of appearance and odors are major drawbacks which prevent installation of the facilities close to the waste water source. The unavailability of remote locations for installation of the small sewage systems and the expense and difficulty associated with obtaining remote locations for sewage treatment use have made such systems impractical.

Systems have been proposed for oxygenating sewage in sewer mains, trunks and interceptors to prevent sewage from becoming septic on its way to treatment facilities. Such systems augment rather than replace large centralized collection systems.

SUMMARY OF THE INVENTION

The present invention provides a closed underground sewage treatment system which may be used, for example, right in the middle of a housing development. The system is disposed entirely underground, and surfaces above the system may be paved or seeded for use as recreational spaces or open spaces. The system of the present invention is suited to housing developments, schools, hospitals, resorts, hotels, industrial plants, military installations, small communities and large subdivisions.

The underground aerobic digestive sewage treatment plants of the present invention are available in capacities ranging from 20,000 gallons per day and below to 1,000,000 gallons per day and above. The completely underground system is odor free, noise free and maintenance free.

Developments which have heretofore required recreational areas, playgrounds, athletic fields, parks and parking lots or other open spaces may with the present invention provide the dual purpose of recreational, utility or open space as well as space for an underground sewage treatment plant.

The system of the present invention may be installed in problem areas with a minimum of land requirement.

The treatment system of the present invention has been approved by Federal, state and local health authorities. The effluent of the system is well above present or expected future minimum standards. Because no large mains and trunks are required, the entire funds available for a sewage system may be applied to the treatment facilities.

In a preferred embodiment of the invention, as used for example in a garden-type apartment development, the main sewage treatment elements are placed directly within a courtyard which is surrounded by garden-type apartments. Sewage is collected in laterals and branches, which feed into a short main. The main supplies a pumping station, which is a pit with a submerged pump. The pump lifts the sewage to a sewer main at slightly below grade. Sewage flows to a grease and trash trap tank. The grease and trash trap has a surface opening for long term periodic removal of grease and trash. Sewage flows upward through a submerged intake in an outlet pipe to a diversion tank which is also underground. The diversion tank has several outlets to parallel aeration tanks. Further screening of inorganic debris and trash may be accomplished in the diversion tank. Outlet openings in the diversion tank are valved so that flow of sewage may be directed to one or more of the aeration tanks. Sewage flows through inlet pipes to the large aeration tanks which are completely buried underground. In a preferred embodiment, each aeration tank is constructed with a cylindrical wall oriented around a horizontal axis and disposed completely beneath grade level. Opposite ends of the cylindrical wall are closed by caps, and the caps have openings for tightly receiving inlet and effluent pipes, sludge and skimmer return pipes, treatment fluid or oxygen supply and vent pipes. Alternatively, a pressurized air distribution line may be supported beside or above the aeration tank. Downward extending secondary distribution lines carry compressed air or oxygen downward toward the bottom of the tank. Release lines extend horizontally in both directions from the lower ends of the secondary distribution lines parallel to an axis of the aeration tanks. Anti-clog, fluid, oxygen or air release headers are mounted on the release lines so that the air or other fluid is released along a line parallel to the tank axis and slightly raised and displaced toward one side from the bottom of the tank. The released fluid rises upward along one side of the tank, promoting movement of the liquid sewage in that same direction, plus the sewage is kept in constant rotating motion within the tank, promoting mixture of the sewage and treatment fluid and promoting proliferation of the organisms which digest the organic material in the sewage.

Preferably, the air distribution line extends into the aeration chamber through one longitudinal end, usually the discharge end. A vent line, which is a large diameter pipe, extends through the top of the other end or inlet end. The distal end of the vent line usually is remote from the aeration tank and is preferably located atop one of the buildings which generates the sewage.

A baffle is constructed at the sewage surface area at the outlet end of the tube, and an effluent pipe is mounted in the upper portion of the outlet end of the aeration tank. The effluent pipe leads effluent from the aeration tank to a large clarifier which is spaced from the tank. In a preferred embodiment, the clarifier is constructed as a cylinder having a vertical axis. A cylindrical wall of the clarifier is capped upwardly by an upper end which includes a manhole-type access opening. The lower wall of the clarifier tapers inward to condense sludge which precipitates from fluid in the clarifier. A sludge return pipe extends downward to a point near the center of the funnel-like clarifier base. The sludge return line extends upward in the clarifier and through an upper portion of the cylindrical wall, through the end plate of the aeration tank adjacent an upper inner surface thereof. The outlet of the sludge return is positioned near the inlet end of the aeration tank so that the digestion process of the entire tank is applied to the return sludge. Preferably sludge is propelled by an air ejection system in which air from the pressurized source is released into a lower section of the vertical portion of the sludge return pipe by an accelerating means. A skimmer is positioned at the water surface in the clarifier. A skimmer line extends downward from the skimmer, then upward and out through an upper portion of the cylindrical clarifier wall and then through the discharge end wall of the aeration tank. The opening of the skimmer return may be at any convenient location in the aeration tank. Pressurized air propels the skimmed solids through the skimmer return line in the same manner that air is used for propulsion in the sludge return line. The propulsion in the return lines enriches the returned sludge and solids with oxygen and promotes bacterial growth and digestion as the material is being returned and after it is flowed back into the aeration tank.

A baffle trough is connected along a wall of the clarifier at the water line, and a discharge pipe is connected to the clarifier in the trough. The discharge pipe empties into a tertiary treatment tank where the effluent is continuously mixed with incoming chlorine, usually in the form of an aqueous solution. Alternatively, the sewage may be irradiated in the tertiary treatment tank. Preferably an ultraviolet light produces ozone to kill organisms in the sewage. An outfall pipe connected to the tertiary treatment tank disposes of the effluent in a convenient and acceptable manner. Preferably, deep wells are drilled and are encased at their upper ends for several feet, and the outfall is directed to the deep wells.

One object of the invention is to provide an enclosed horizontally elongated tank having restricted openings for receiving inlet, effluent, vent, pressurized oxygen and solids return pipes which may be buried underground close to or within populated developments.

The invention has as another object the provision of a completely buried sewage treatment and disposal system for locating underground beneath usable land surfaces.

The invention has as another object the provision of an underground sewage treatment and disposal plant for positioning within a populated area having remote air pressure supplies and vents for continuously operating a system with minimal supervision directly within an area used by a population.

Another object of the invention is the elimination of mains, trunks and interceptors in a sewage collection and treatment system.

These and other objects of the invention will be apparent from the disclosure, which comprises the foregoing and ongoing specification, including the claims, and the drawings.

DETAILED DESCRIPTION OF THE DRAWINGS

Figure 1:
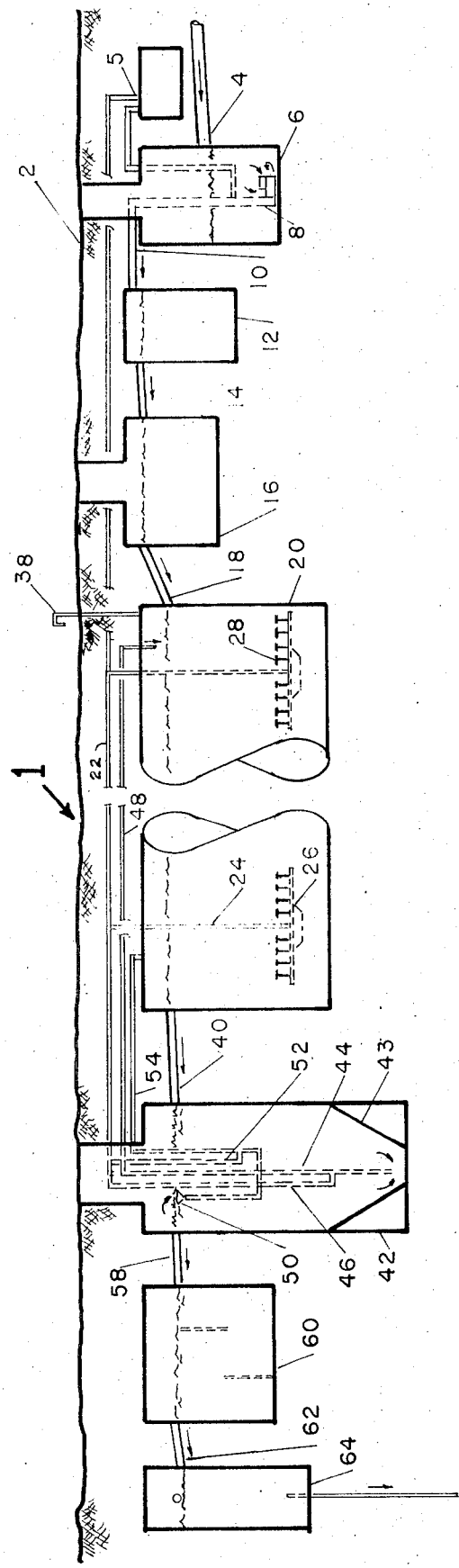
FIG. 1 is a schematic representation of an underground sewage disposal system constructed according to the teachings of the present invention, showing the closed aeration tank in foreshortened form for convenience.

Referring to FIG. 1, an underground sewage treatment apparatus is generally indicated by the numeral 1.

The surface of ground directly within a center of a housing development is indicated by the numeral 2. Sewage in a collection main 4 drops into a pump pit 6. A submersible pump 8 is mounted in the bottom of the pit. The pump may be electrically driven, or blower 5 may supply air to airlift the sewage from pit 6. Sewage flows through pipe 10 to grease and trash trap 12. Baffles within tank 12 hold debris and grease in the tank. Tank 12 has an access to the surface of the ground offset from the plane of the drawing. From the grease and trash trap tank 12, sewage flows through pipe 14 to distribution box 16. The distribution box further traps inorganic debris. The other function of distribution box 16 is later described with reference to FIG. 3. Sewage flows through inlet pipe 18 from the distribution box 16 to aeration chamber 20.

Figure 2:
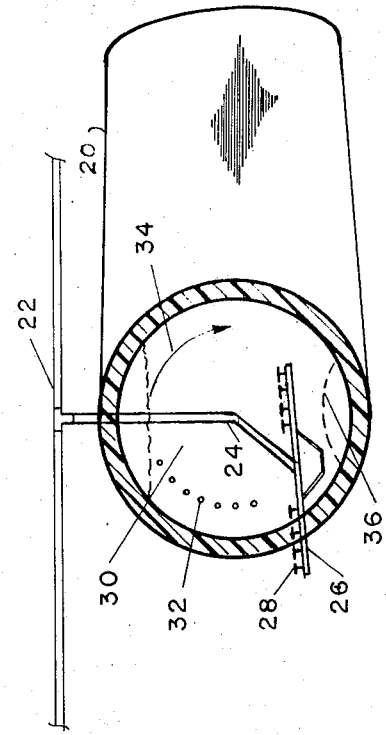
FIG. 2 is a detail of enclosed aeration tank.

Treatment fluid which may be oxygen and in the present case is compressed air is pumped by blower 5 through distribution line 22 as shown in FIG. 2 and through vertical distribution lines 24 downward to release lines 26 to anti-clog release headers 28. The release headers are positioned slightly upward and to one side of the bottom tank 20 so that air bubbles 32 flow upward along the side of the tank, influencing sewage 30 to continuously rotate in the tank in the direction of arrow 34. The rotation of the sewage insures good mixture with the oxygen in the air to encourage proliferation of the microbes which digest organics in the sewage. Rotation of sewage 30 also encourages the continued stirring of sludge 36 from the bottom of the tank so that oxygen reaches the sludge to aid the digestion process.

As shown in FIG. 1, a vent pipe 38 extends upward from the digestion tank. Preferably, the vent pipe is of a size equivalent to the inflow and outflow pipes, and preferably, the above-ground portion of the vent pipe is located at a distance from the treatment plant atop a close by building. Sewage flows out of the aeration tank past conventional baffles into effluent pipe 40. Pipe 40 carries the effluent to clarifier tank 42 which has a sloped bottom 43 for concentrating precipitated sludge. Sludge is removed from clarifier 42 through the lower open end of the vertical portion 44 of sludge return line 48. Air from distribution system 22 is pumped through line 46 and is released in the sludge return line in a conventional manner which is sufficient to propel the sludge upward and back to the aeration tank through return line 48. A skimmer 50 is disposed in the clarifier. Air from line 52 drives solids picked up by skimmer 50 through skimmer return line 54 into aeration tank 20.

For clarity, return lines 48 and 54 have been shown as penetrating the cylindrical wall of tank 20. In a preferred embodiment, the return lines pierce an upper portion of the discharge end wall of tank 20. In the same manner, it is preferable for vent line 38 to be installed in an opening in the intake end wall of tank 20, and air distribution line 22 may be inserted in one of the end walls of the tank.

As shown in one embodiment, air distribution line 22 extends from blower 5 across the entire treatment system. In a preferred arrangement, blower 5 is mounted in a building near the system, preferably close to the clarifier. Air distribution line 22 extends underground from the blower and into tank 20 through the discharge end of the tank.

From the clarifier, the effluent passes a trough-like baffle and flows through discharge pipe 58 into tertiary treatment tank 60. Chlorination or irradiation such as with ultraviolet light is effected within treatment tank 60. Baffles within the tank assure mixing of the embodiments. From tertiary treatment tank 60 the effluent passes through outfall pipe 62 to a surge tank 64 and is discharged into deep wells having fixed casings extending downward to near the bottom. At that point, the effluent is substantially pure water.

Figure 3:
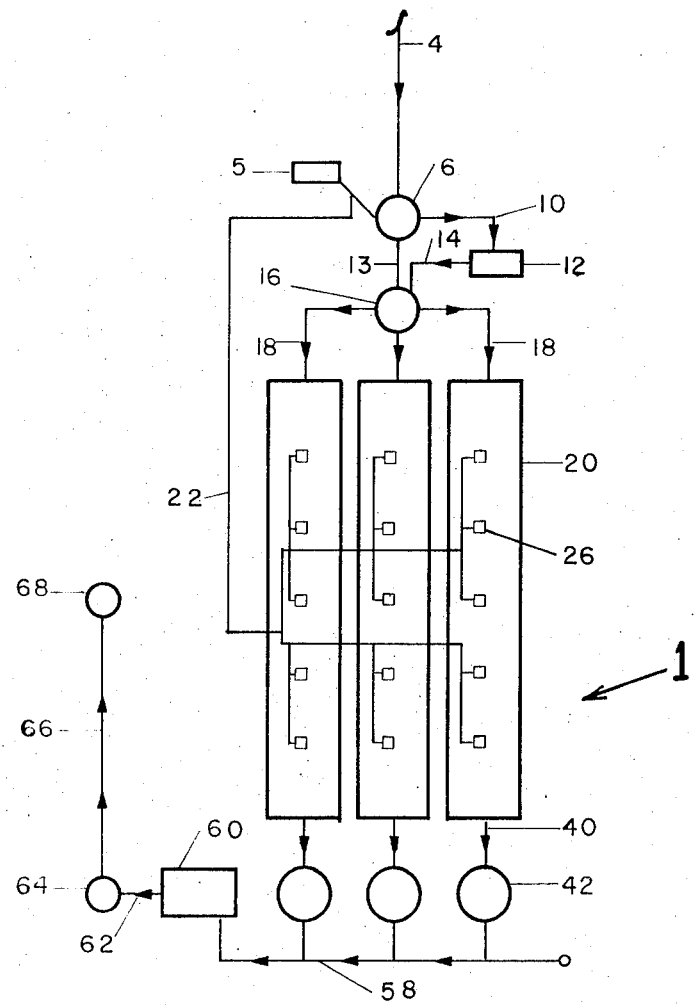
FIG. 3 is a plan schematic detail of a system such as shown in elevation in FIG. 1 having parallel connected aeration tanks and clarifiers.

FIG. 3 is a plan view of the system shown in elevation in FIG. 1.

Elements in FIG. 3 have the same numerals as like elements in FIG. 1. The lower housing 5 is shown mounted to one side. For clarity, the air distribution system is shown connected only to the distribution elements 26 within the parallel aeration tanks 20. Sludge and skimmer return lines and air propulsion connections to those lines are omitted for clarity in FIG. 3. An air connection from blower 5 to pump pit 6 is shown to provide an airlift of the sewage from the pump pit.

In FIG. 3, bypass 13 is shown as an additional connection between pump pit 6 and distribution box 16. Bypass 13 may be opened, and pipes 10 and 14 may be closed when it is desired to remove debris and grease from trap tank 12.

Distribution box 16 has the function of controlling distribution between the three parallel sewage input pipes 18 which carry sewage to the parallel aeration tanks 20. Pipes 18 may be selectively closed to stop sewage flow through one of the channels. A separate clarifier 42 is connected to the effluent end of each aeration tank 20. As shown in the drawing, discharge pipe has a clean out opening at one extremity. Tertiary treatment tank 60 is mounted at the other extremity. Outfall pipe 62 carries the purified effluent to surge tank 64 above a disposal well, and overflow pipe 66 connects the surge tank 64 with a second surge tank 68 above a second disposal well.

In one example of the invention, an 8-inch main carries sewage to a lift station. Sewage is pumped through a 4-inch pressure line from the lift station to a grease and trash trap tank.

A 6-inch vent is preferably connected between an upper end of the lift station or pump pit and the grease and trash trap tank.

The pump pit may be of any convenient size. For example, a vertical axis cylinder having a diameter of approximately 6 feet and a height of 6 feet may be employed. An automatic level control turns the pump on when sewage within the lift station reaches a maximum level and turns the pump off when sewage falls to a minimum level. A grease and trash trap tank may be of any convenient size. A rectangular tank, 5 by 10 by 6 feet deep, is used in the example. An 8-inch outlet pipe has an opening below the surface of sewage in the grease and trash trap tank. The 8-inch pipe discharges into a three-way flow diversion tank which may be constructed of a vertical axis cylinder having a 4-foot diameter and a 2-foot vertical wall. A baffle slows flow from the grease tank, and an adjustable weir extending across the tank has three sections to control flow respectively to the three 6-inch pipes which serve as sewage input pipes to the aeration tank.

Each of three aeration tanks is constructed of cylindrical sections joined together to form a long cylindrical tank with a horizontal axis. Each tank may have a diameter of 8 feet and a length of 160 feet. Air is fed to the tank in a 1½ inch air line and is directed downward in a 1¼ inch distribution line. Non-clog diffuser assemblies are mounted on horizontal 1¼ inch release lines. The air vent from each tank is preferably a 6-inch pipe.

The clarifiers are vertical cylinders having diameters of 8 feet and heights of approximately 12 feet. Bottom walls are sloped at a 60° angle to the horizontal. Three-inch sludge return lines and 2-inch skimmer return lines are supplied by ¾ inch air lines. Six-inch pipes connect the aeration tank and the clarifiers and connect the clarifiers to the tertiary treatment tank, which may be a 1,000 gallon chlorine contact tank. Effluent is contained in the chlorine contact tank for about 20 to 25 minutes. In a preferred embodiment, two surge tanks 4 feet in diameter and 4 feet in height are positioned above 4-inch disposal wells. In one example, wells are drilled to 72 feet with a casing extending 50 feet downward.

All pipes may be cast iron or polyvinyl chloride. The tanks may be concrete, lined with some friction reducing material, with sections joined as necessary by neoprene clamping collars. Alternatively, the tanks may be made of some tough synthetic material such as fiberglass. Ends of the tanks may be cast in place with reinforcements joining the ends and the tank bodies.

The aeration plant of the example is designed to treat 60,000 gallons of raw sanitary domestic waste water of an area inhabited by approximately 600 people. The aeration tanks have a capacity of not less than 60,000 gallons and are designed to retain the sewage for a minimum of 24 hours. Dual blowers each provide 230 feet per minute of intake air at an output pressure of 3.5 pounds per square inch.

Although the present invention has been described in part with reference to a specific example, modifications and variations may be constructed or used without departing from the scope of the invention, which is precisely defined only in the following claims.

I claim:

1. The sewage treatment apparatus comprising a closed ambient pressure operating aeration tank having a cylindrical wall oriented around a generally horizontal axis for maintaining rotary flow of sewage in the tank and for supporting overlying material and having ends joining the wall in completion of a closed chamber, the aeration tank further having restricted openings receiving a sewage inflow pipe, an effluent outflow pipe, a solids return pipe, an oxygen input pipe and an open atmospheric vent pipe, wherein the aeration tank cylindrical wall is disposed underground and is completely covered by a usable recreation surface, and wherein all of the aeration tank openings are disposed underground, wherein the atmospheric vent pipe, sewage inflow pipe and effluent outflow pipe are open to atmospheric pressure and the tank is open to atmospheric pressure and wherein the cylndrical wall of the tank supports overlying ground and maintains rotary motion of sewage within the tank, and an underground clarifier connected to the distal end of the outflow pipe spaced from the aeration tank, the outflow pipe discharging into the clarifier, the solids return pipe connected to the clarifier and extending from the clarifier to the aeration tank.

2. The sewage treatment apparatus of claim 1 wherein the aeration tank has a relatively small vertical diameter and a relatively large horizontal length, the ratio of length to diameter being substantially greater than three to one.

3. The sewage treatment apparatus of claim 1 wherein the ratio of length to diameter is approximately six to one.

4. The sewage treatment apparatus of claim 1 further comprising an underground effluent outflow pipe connected to the tank at an opening in an upper portion of one end of the tank and an underground clarifier comprises a closed cylinder having a vertical cylindrical wall surrounding a vertical axis, having a substantially planar top and having a sloped conical form base for concentrating solids precipitating from fluid in the clarifier and a pressurized air line connected to the sludge return line in a vertical portion thereof for propelling sludge and precipitated solids from the clarifier to the aeration tank.

5. The sewage treatment apparatus of claim 4 further comprising a sewage inlet pipe connected to an opening in the aeration tank at an end opposite the connection of the effluent outflow pipe, a diversion tank connected to the sewage inlet pipe, and further comprising a plurality of sewage inlet pipes connected to the flow diversion tank, means to selectively open the pipes, and a plurality of parallel closed cylindrical underground aeration tanks with horizontal axes connected individually to the sewage pipes, a like plurality of effluent pipes connected at remote ends of the closed aeration tanks, and a like plurality of clarifier tanks connected at remote ends of the effluent pipes, whereby the aeration tanks and clarifiers are employed in parallel and are selectively activated.

6. The sewage treatment apparatus of claim 1 further comprising a sewage inlet pipe connected to an opening in one end of the aeration tank, a diversion tank connected to the inlet pipe for supplying sewage to the inlet pipe, a grease and trash trap tank connected to the diversion tank for supplying sewage to the diversion tank, a sewer connected to the grease and trash trap tank for supplying sewage to the grease and trash trap tank, an effluent pipe connected to an outlet opening of the aeration tank, a clarifier connected to the effluent pipe for receiving and holding effluent from the aeration tank, a skimmer mounted in the clarifier, and a skimmer return line connected between the skimmer and the aeration tank for returning floating solids to the aeration tank, the sludge return line mounted in the clarifier and terminating near a bottom of the clarifier and extending from the clarifier to the aeration tank for turning precipitated sludge from the clarifier to the aeration tank, a discharge line connected to the clarifer, a tertiary treatment tank connected to the discharge line for receiving sewage from the clarifier and for tertiary treating of the sewage, an exhaust line connected to the tertiary treatment tank, and outfall means connected to the exhaust line for disposing treated liquid from the sewage treatment apparatus, and wherein all of the elements of the system are underground.

7. The sewage treatment apparatus of claim 6 further comprising a source of pressurized treatment fluid, a distribution line connected to the source, to the aeration tank and to the skimmer return and sludge return lines, propulsion means connected to the distribution line and to the skimmer and sludge return lines for propelling solids and sludge through the lines under influence of the pressurized fluid, fluid release means connected to the distribution line and mounted within the aeration tank slightly upward and to one side from a bottom of the aeration for releasing fluid from the source along a lateral area of the tank to promote upward flow of the fluid along a lateral area of the tank for influencing rotation of the sewage within the tank, thereby promoting mixture of the fluid from the source and sewage within the aeration tank, and further wherein the distribution lines are underground.

8. The sewage treatment apparatus of claim 7 wherein the source of pressurized fluid is mounted in a structure remote from the aeration tank and further comprising a vent line connected to the aeration tank and extending upward from a structure remote from the aeration tank.

9. The sewage treatment apparatus of claim 1 wherein the aeration tank is mounted on board a ship and further comprising a sewage inflow pipe connected to the tank and to a shipboard source of sewage.

* * * * *